(12) United States Patent
Naedler

(10) Patent No.: US 6,484,774 B1
(45) Date of Patent: *Nov. 26, 2002

(54) VEHICLE TIRE INFLATION SYSTEM

(75) Inventor: Mark H. Naedler, Houston, TX (US)

(73) Assignee: Vehicle Inflation Technologies, Inc., Montgomery, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/880,618

(22) Filed: Jun. 12, 2001

Related U.S. Application Data

(63) Continuation of application No. 09/379,148, filed on Aug. 21, 1999, now Pat. No. 6,244,316.
(60) Provisional application No. 60/145,486, filed on Jul. 16, 1999.

(51) Int. Cl.[7] ............................................... B60C 23/10
(52) U.S. Cl. ........................................ 152/417; 152/416
(58) Field of Search ............................... 152/415, 416, 152/417, 418

(56) References Cited

U.S. PATENT DOCUMENTS

| | | | | |
|---|---|---|---|---|
| 6,244,316 B1 | * | 6/2001 | Naedler | 152/417 |
| 6,260,595 B1 | * | 7/2001 | Cobb | 152/417 |
| 6,269,691 B1 | * | 8/2001 | Sowatzke et al. | 152/417 |

* cited by examiner

*Primary Examiner*—S. Joseph Morano
*Assistant Examiner*—Long Bao Nguyen
(74) *Attorney, Agent, or Firm*—Browning Bushman P.C.

(57) ABSTRACT

Alternate embodiments of a vehicle tire inflation system are illustrated wherein pressurized air from a source on the vehicle is supplied from an end of an axle to the rotating hub cap and thus to the tire through a flexible tube which compensates for misalignment of the axes of the axle and hub cap.

2 Claims, 6 Drawing Sheets

VEHICLE TIRE INFLATION SYSTEM

CROSS-REFERENCE TO RELATED APPLICATIONS

This application is a continuation of U.S Ser. 09/379,148 U.S. Pat. No. 6,244,316, filed on Aug. 21, 1999, which in turn claims the benefit of U.S. Provisional Application Serial No. 60/145,486, filed on Jul. 16, 1999.

REFERENCE TO RELATED PROVISIONAL APPLICATION

This application claims the benefit of my Provisional Application filed Jul. 16, 1999, and entitled "Vehicle Tire Inflation System".

FIELD OF THE INVENTION

This application relates generally to a vehicle tire inflation system for continuously supplying air from the vehicle's axles to the rotating tires. In one of its aspects, it relates to a system of this type having an improved rotary union connection to transmit pressurized air from an axle end to the surrounding rotating hub cap by means of a tube received at one end near the center of the axle end and at the second end near the center of the hub.

BACKGROUND OF THE INVENTION

The commercial trucking industry is a large market in need of automatic tire inflation systems. Tractor and trailer rigs can typically have 18 tires, and because of their constant use and cost it can be justifiable for a fleet to purchase tire inflation systems for tire pressure maintenance. Properly inflated tires can greatly extend tire life and reduce hazardous blowouts. To meet the needs of the trucking industry, a low cost, low maintenance, and durable rotary union is essential.

A typical rotary union for such a system has one member fixed in relation to the end of the axle and another fixed in relation to the hub cap. Some will incorporate a smooth graphite face seal to serve as the dynamic wear seal and others use elastomer seals. Most existing designs have relatively large dynamic sealing surfaces and their size is proportional to the surface speed of the wearing surface. Large seals can compensate for misalignment between the axle and hub cap since the large cross-section will expand and contract with every half rotation. A larger seal helps guarantee sealing but generates more heat, costs more, and generally wears more quickly. Some tire inflation systems add expensive controls to provide air only momentarily to the rotary unions to extend their life, limiting the effectiveness of the inflation system.

As shown in U.S. Pat. No. 5,769,979, the rotary union is able to use a small dynamic seal by compensating for bearing wobble and misalignments between the hub and axle through the use of a pivoting rigid tube extending between two elastomer seals. Distortion of the elastomer seals while the tube pivots can impair their sealing ability and longevity. Providing sufficient clearance around the seals so the rigid tube can pivot freely can also be a detriment to a seal's performance since proper backing isn't provided for the seal. A rigid tube also is vulnerable to permanent bending during handling and installation.

SUMMARY OF THE INVENTION

The object of this invention is to provide a system having an improved rotary union for durability and wear, wherein, as compared with other systems, the tube is flexible so as to compensate for bearing wobble and misalignment between the axis of the axle and the axis of the hub. Elongate openings in the rotary union's members affixed to the hub cap and to the axle, guide the flexible tube through the seal rings contained within the members. Thus, this invention also allows the ends of the tube to remain axially aligned with the seal rings to provide more reliable seals, and thus allow for greater misalignment than a pivoting rigid tube, as in U.S. Pat. No. 5,769,979. The improvement also allows for greater durability during installation and operation since the tube will not be weakened or destroyed if it is bent.

The flexible tube allows for another novel embodiment of the invention. Since substantial lengths of the tube ends are contained in the elongate openings, redundant seal rings can be added along the tube's length contained in the elongate openings. This provides the ability for air to be vented to the atmosphere in the event of a leak in the outermost seal contained within the member affixed to the hub cap. A redundant seal and a vent to the atmosphere between the two seals in this will prevent air from entering the lubrication compartment between the axle end and hub cap.

In the preferred and illustrated embodiments of the invention, the tire inflation system includes a rotary union having a first member which is fixed in relation to a hollow axle, a second member fixed in relation to a hub, both having an elongate opening therethrough, and a flexible tube which is received at its first end within a first seal ring carried about the opening in the first member and received at its second end within a second seal ring carried about the second member near the hub's axis, at least one of which forms a dynamic seal during the hub's rotation, wherein misalignment between the hub axis and the axle axis is compensated for primarily by the flexibility of the tube. The seals prevent air passage from around the outer diameters of the flexible tube, and the elongate opening in each member aligns the end of the flexible tube so that segment of the flexible tube which passes through the seal ring remains coaxial with the opening during rotation.

In order for the system to inflate a tire, the vehicle requires a frame mounted source of air pressure to supply air as needed to the tires. Pressurized air passes through a system of valves and through the hollow axle to pressurize the seal ring of the rotary union's first member. Air then passes through the flexible tube to pressurize the seal ring carried about the opening in the rotary union's second member, and finally is sent from the second member through a pressure conduit to the tire.

The flexible tube is held in alignment with the small seals in each rotary union member, at least one of which is a dynamic, and a third dynamic seal can be added in line with the seal in the second member to divert air through a vent between the seals directly to the atmosphere in the event the first dynamic seal leaks. Thus, this improvement prevents unwanted pressurization of the lubricated bearing compartment, which when pressurized can destroy the wheel seal and purge the lubricant causing bearing failure.

IN THE DRAWINGS

DESCRIPTION OF THE INVENTION

Figure 1:
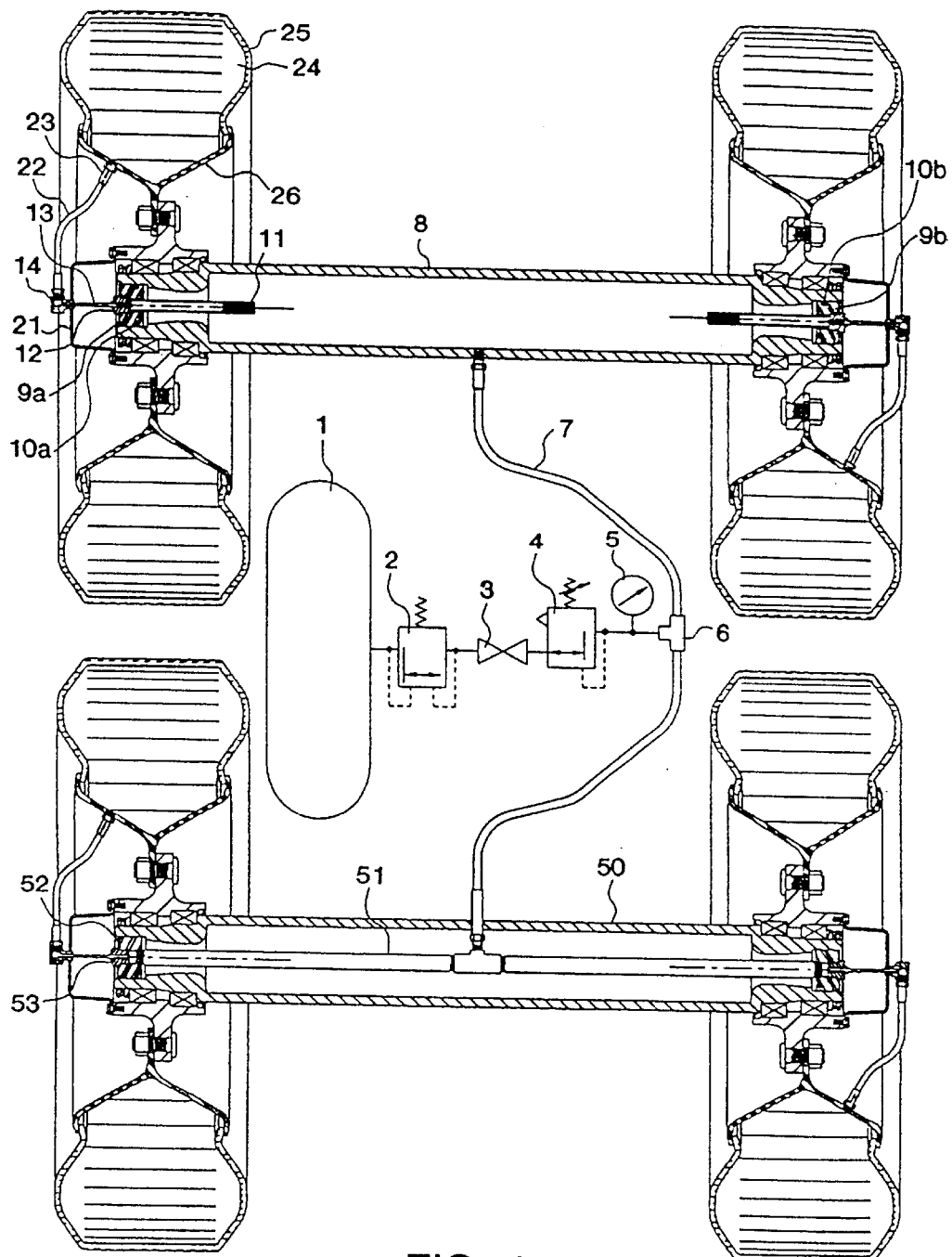
FIG. 1 is a vehicle equipped with a tire system utilizing the new rotary union.

With reference now to the details of the drawings, the vehicle tire inflation system of FIG. 1 is shown to include an air reservoir 1 mounted to the frame of the vehicle. A pressure protection valve 2 receives air from the reservoir. When a minimum amount of pressure is reached in the reservoir 1, the pressure protection valve 2 opens and allows air to pass to the shut-off valve 3. When the system is operating, the shut-off valve 3 will be manually opened to send air to the pressure regulator 4. The pressure regulator 4 reduces the reservoir pressure to the desired pressure in the vehicle's tires. A pressure gauge 5 allows for proper adjustment of the pressure regulator 4.

A manifold 6 then makes it possible to deliver air to a plurality of axles. A conduit 7 delivers air to the axle 8 which is hollow and sealed at both ends by the plugs 9A and 9B and their respective seals 10A and 10B. The axle 8 is pressurized with the air from the attached conduit 7. The pressurized air in the axle then passes through a filter 11 and into the opening of the first rotary union member 12, which is sealably connected to the axle plug 9A and held near the axle's axis with pipe threads.

Figure 2:
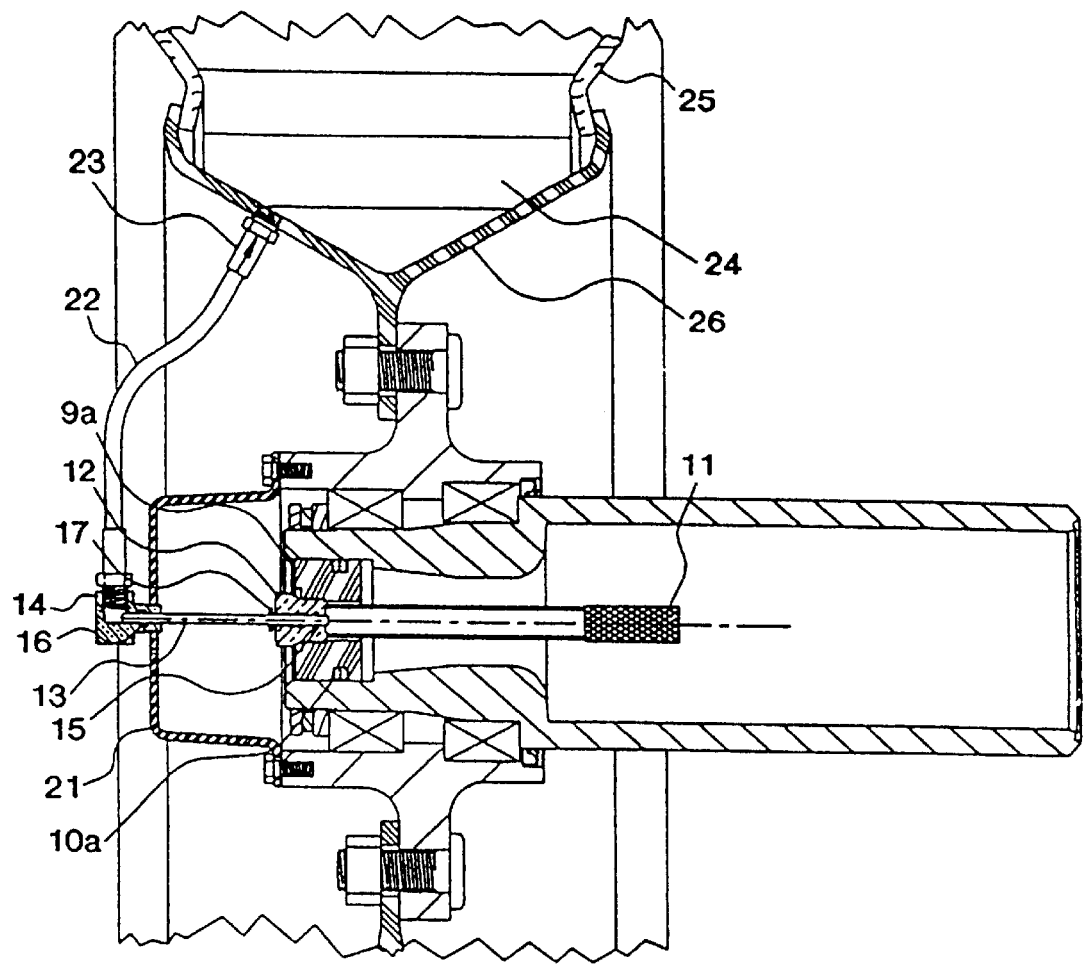
FIG. 2 is a cross section of one embodiment of the rotary union housed in the axle end and hub cap.

FIG. 2 is a closer view of the rotary union wherein the pressurized air is passed from the first rotary union member 12 to the flexible tube 13 and sealed by the static seal 15 carried about the opening through the member. A compression fitting 17, in this case a collet, is used to hold the flexible tube in place. The flexible tube 13 then sends the pressurized air into the opening in the second member 14 of the rotary union which is attached near the axis of the hub cap 21. A dynamic seal ring 16 is carried about the opening in the second member to form a rotatable seal between the flexible tube 13 and the second member 14. Once the pressurized air is in the rotatable second member 14, it is sent through a conduit 22 and a one-way check valve 23 into the pressurized area 24 formed by the tire 25 and the wheel 26.

FIG. 1 illustrates a second axle 50 which is hollow but does not act as a pressurized conduit as does the first axle 8. Instead, a conduit 51 is housed inside the axle 50 and the stabilizing plug 52 forms a union for the conduit 51 and the first member of the rotary union 53.

Figure 3:
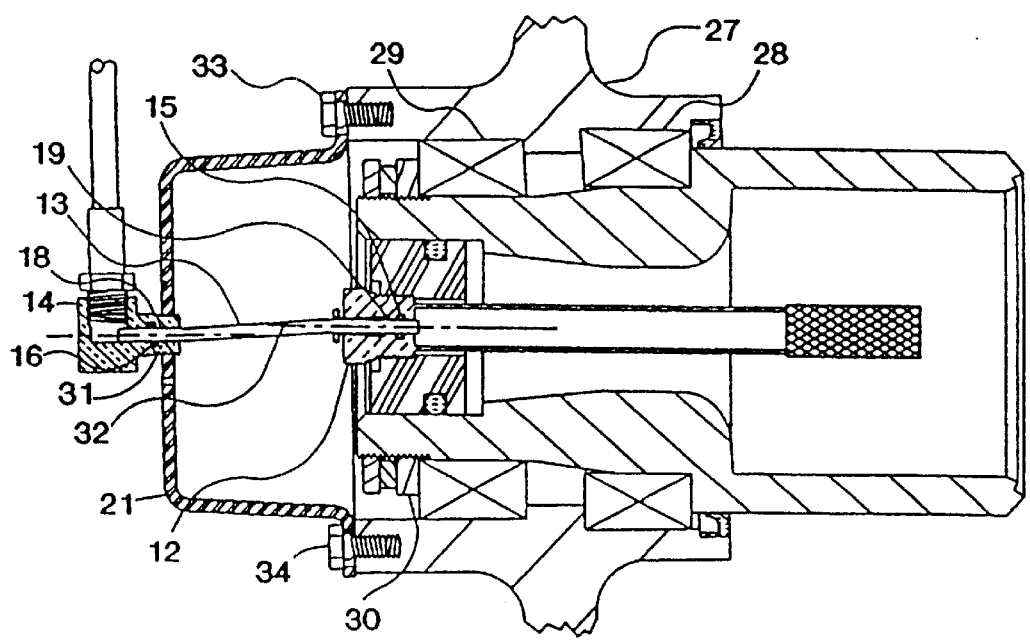
FIG. 3 is a cross section of the rotary union similar to FIG. 2, but illustrating misalignment of the axes of the axle and hub.

FIG. 3 is illustrative of misalignment between the hub cap axis 31 and the axle axis 32 which may be created by slop in the bearings 28 and 29, and manufacturing tolerances such as the placement of the hub cap 21 on the hub 27 and their attachment by the bolts 33 and 34. However, this misalignment does not disturb the function of the rotary union, as will be apparent from enlarged FIG. 3A, wherein the axis 31 of the hub cap 21 is non-concentric with the axis 32 of the axle 8.

Figure 3A:
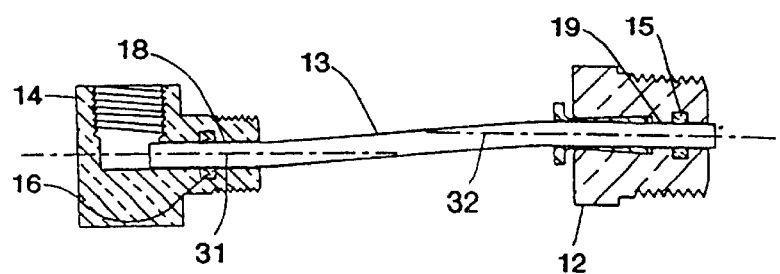
FIG. 3A is an enlarged view of the rotary union to further illustrate misalignment.

Instead the ends of the rotary union's flexible tube 13 are able to bend and pass straight through both the seal ring 15 of the rotary union's first member's opening, as well as a seal ring 16 in the rotary union's second member's opening. The elongate opening 19 closely and guideably receives the tube 13 so it does not distort the seal ring 15 during rotation. The second member 14 is equipped with a similar elongate opening 18 so the flexible tube 13 does not distort seal ring 16. This function is best illustrated in FIG. 3A. FIG. 3A also shows a sleeve 66 tightly about a mid portion of the tube to prevent buckling which might occur if the first and second members are widely spaced. A bell-mouth 67 makes it possible to thread the supple tube 13 into the elongate opening 18 during installation. A radius 70 at the rim of the opening 18 prevents concentrated wear between the flexible tube 13 and the second member 14 during rotation.

Figure 4:
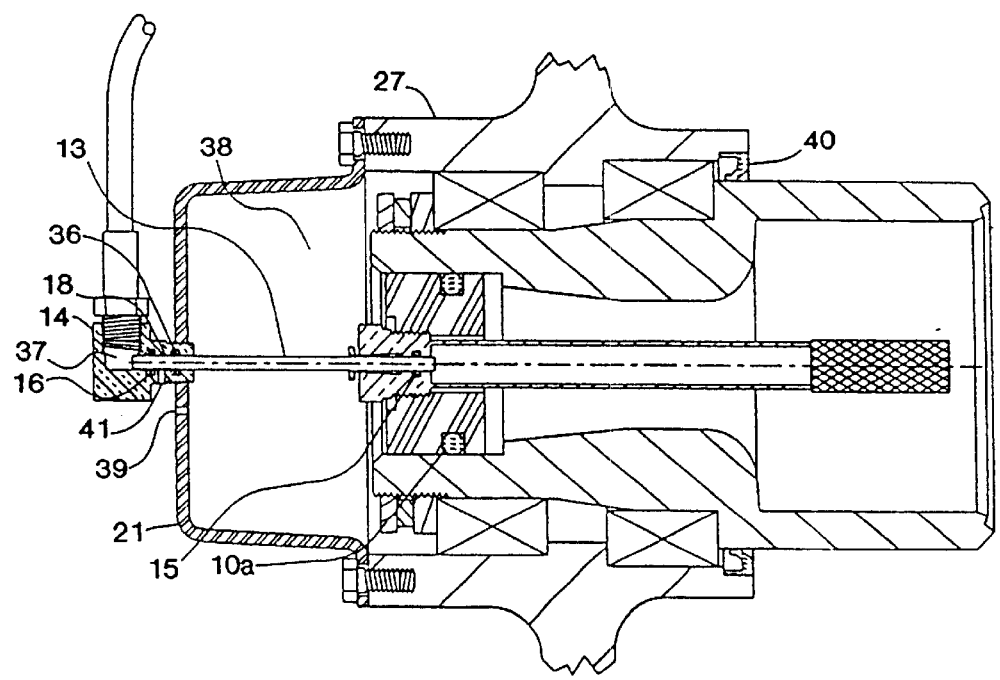
FIG. 4 is a cross section of another embodiment of a rotary union equipped with an additional seal vent to atmosphere.

FIG. 4 illustrates a modified version of the invention wherein the end of the flexible tube 13 passes coaxially through the dynamic seal ring 16 and an additional seal 36, about the opening 18 inwardly of ring 16. The third seal ring 36 is not a normally pressurized seal, but instead prevents pressurized air that might leak past the wear seal ring 16 from entering the bearing lubrication compartment 38 by diverting it out a vent 41. The bearing lubrication compartment 38 is normally vented an orifice 39, however, without the seal ring 36 in place, added air pressure from a leak at the wear seal ring 16 could introduce contaminants into the lubrication compartment 38 and extra pressure can cause premature failure of the wheel seal 40.

Figure 5:
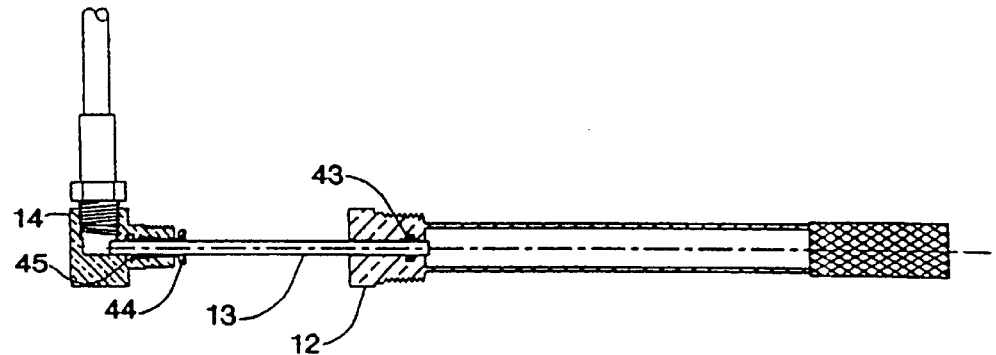
FIG. 5 is still another embodiment wherein the dynamic seal is mounted in the member of the rotary union on the axle.

FIG. 5 is a modified version of the rotary union wherein the dynamic wear ring 43 is in the member 12, and the collet 44 and the static seal ring 45 are housed in the rotary union's second member 14. Bearing wobble and other misalignments are still compensated for with the flexible-tube 13. Here a bell-mouth 68 on the first member 12 makes it possible to thread the pliable tube 13 into the elongate opening 19 during installation. A radius 69 eliminates a sharp corner and prevents concentrated wear between the tube 13 and the first member 12 during rotation.

Figure 6:
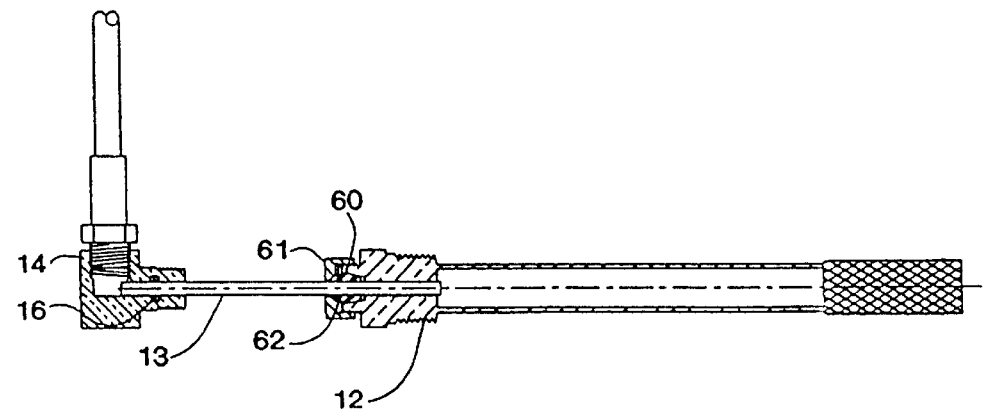
FIG. 6 shows yet another embodiment having a modified static seal in the first member.

The modified version of the rotary union shown in FIG. 6 is similar to that of FIGS. 2 and 3 in that the dynamic seal ring 16 is carried by the second member 14. The first member 12 differs, however, in the manner in which it holds and seals about the tube 13 to compensate for misalignment between the axle and the hub. Thus, a metallic compression ring 60 having one tapered end received in a tapered recess in the end of member 12 and the other tapered end received in the end of a tapered recess in the open end of the compression nut 61 threadedly connected about the member to force the compression ring 60 against the tapered recess of the first member 12 to form a seal therewith. The compression nut 61 holds the compression ring 60 which forms a seal against the outer diameter of the flexible conduit 13 forming a seal therewith and holding the tube 13 in place. The seal 62 is held rigidly while the tube 13 must flex for misalignment.

Figure 7:
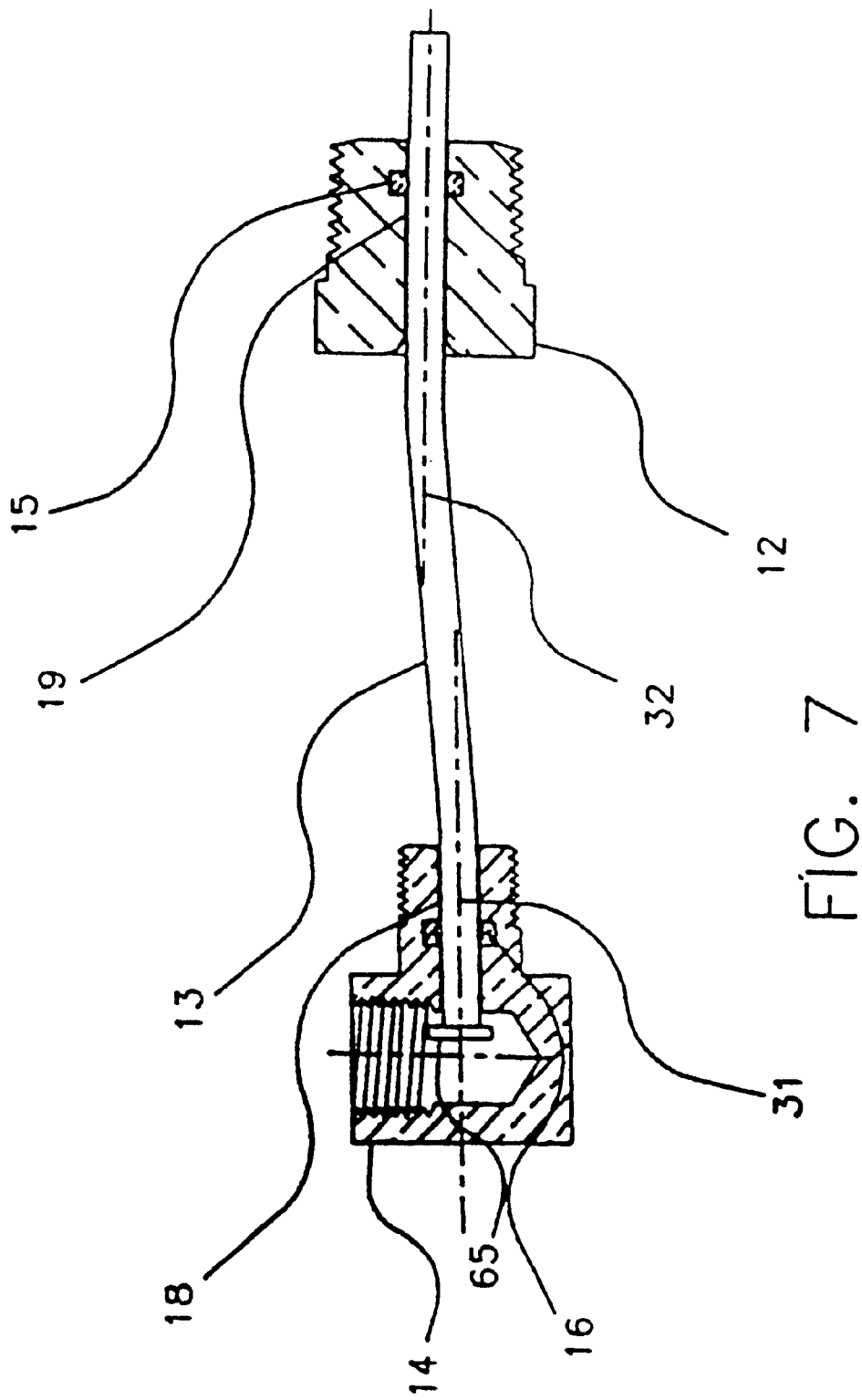
FIG. 7 shows still another embodiment of rotary union wherein either or both of the seals may be dynamic.

In the modified form of the rotary union shown in FIG. 7, the seal rings 15 and 16 carried about the elongate openings in both members of the rotary union are dynamic, or at least capable of same, having in mind that friction may cause one to be static. In this form, a flange 65 on the left outer end of tube 13 prevents it from being pushed out of the members 12 and 14. As shown, the seal ring 16 is a lip type, rather than an O-ring as in the case of the seal ring 15.

In each of the above described embodiments of the rotary union, the outer member 14 carrying the outer seal ring is so connected to the hub cap as by means of the threads that it may be removed from the outside of the cap to permit replacement of wear parts without removal of the cap.

The flexible tube is preferably made of any plastic material having the required characteristics of resistance to heat, wear, and fatigue. Preferably, however, in accordance with the preferred and illustrated embodiments, the tube is made of fluorocarbon polymer, which I believe to best perform the desired functions.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. In a tire inflation system for a vehicle having at least one axle with at least one pneumatic tire mounted on the end of an axle for rotation about the axle end and a source of pressurized air carried by the vehicle for supplying air to the interior of the axle and then to a hub cap to inflate the tire, the improvement comprising:

a first rotary union member mounted on the end of the axle and having a first opening therethrough and with a first air tight seal ring carried thereabout;

a second rotary union member to rotate with the hub cap and having a second opening therethrough in general alignment with the first opening, second and third air tight seal rings carried thereabout the second opening, and a tube having a flexible segment and a first end extending into said first opening and sealably through said first seal ring; and a second end extending into said second opening and sealably through said second seal ring, whereby said flexible segment may bend between said openings of the first and second members;

the second and third pneumatically seal rings being dynamic, and an air passage connecting the area between the second and third seal rings to the outside atmosphere.

2. As in claim 1, wherein said second and third seal rings are elastomer seals.

* * * * *